US009643290B1

(12) United States Patent
Leighner

(10) Patent No.: US 9,643,290 B1
(45) Date of Patent: May 9, 2017

(54) LINE FOLLOWING POWER TOOL

(71) Applicant: Andrew Leighner, Dayton, OH (US)

(72) Inventor: Andrew Leighner, Dayton, OH (US)

( * ) Notice: Subject to any disclaimer, the term of this patent is extended or adjusted under 35 U.S.C. 154(b) by 445 days.

(21) Appl. No.: 14/479,146

(22) Filed: Sep. 5, 2014

Related U.S. Application Data

(60) Provisional application No. 62/016,925, filed on Jun. 25, 2014.

(51) Int. Cl.
*B23Q 15/007* (2006.01)
*G05B 11/01* (2006.01)
*B26D 5/00* (2006.01)
*B26D 5/06* (2006.01)

(52) U.S. Cl.
CPC ........... *B23Q 15/007* (2013.01); *B26D 5/007* (2013.01); *B26D 5/06* (2013.01); *G05B 11/011* (2013.01)

(58) Field of Classification Search
CPC ...... B23D 49/162; B25F 5/001; B23Q 15/007
USPC .................................. 173/1, 24, 29, 213, 90
See application file for complete search history.

(56) References Cited

U.S. PATENT DOCUMENTS

| | | | | |
|---|---|---|---|---|
| 7,356,930 B2 * | 4/2008 | Wadge | ................. | B23D 59/006 30/123.3 |
| 2006/0185173 A1 * | 8/2006 | Wadge | ................. | B23D 59/006 30/165 |
| 2009/0013536 A1 * | 1/2009 | Kaiser | ................. | B23D 51/025 30/123.3 |
| 2009/0025233 A1 * | 1/2009 | Kaiser | ................. | B23D 49/167 30/392 |
| 2009/0077814 A1 * | 3/2009 | Gibbons | .............. | B23D 49/167 30/376 |
| 2009/0094838 A1 * | 4/2009 | Chan | ...................... | B23D 51/10 30/161 |
| 2009/0126549 A1 * | 5/2009 | Dietz | .................... | B23D 55/084 83/817 |

* cited by examiner

*Primary Examiner* — Nathaniel Chukwurah

(57) ABSTRACT

An apparatus for use with a machine tool that comprises a base plate with a cut hole; at least one drive motor attached to the base plate; at least one wheel mechanically attached to the at least one drive motor; a microprocessor electrically connected to the at least one drive motor, the microprocessor having a switch input and memory, the memory comprising parameters corresponding to the shape and position of a cut area and a cut point within the cut hole; a switch electrically connected to the switch input; and an optical sensor having an optical axis and a field of view, the optical sensor spaced a distance from the base plate between the first end and the cut hole and electrically connected to the microprocessor, the optical sensor oriented so that the cut hole is within the field of view.

12 Claims, 11 Drawing Sheets

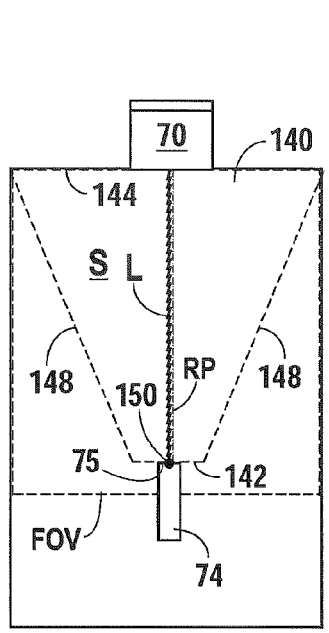
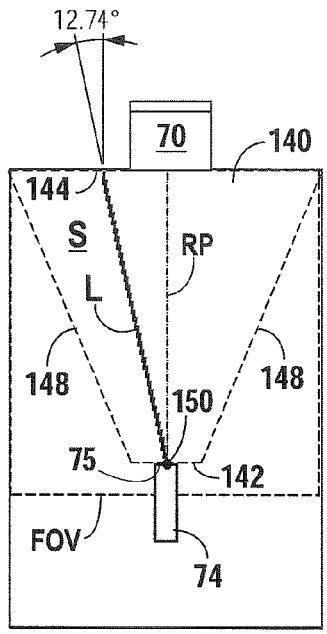
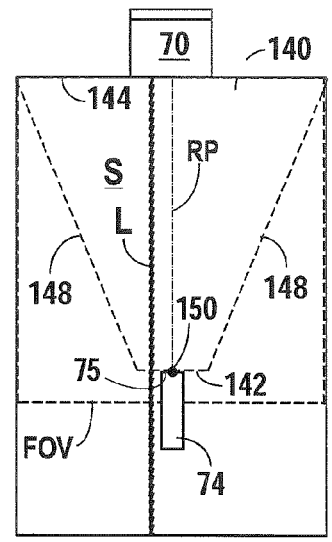
Fig. 6         Fig. 7         Fig. 8
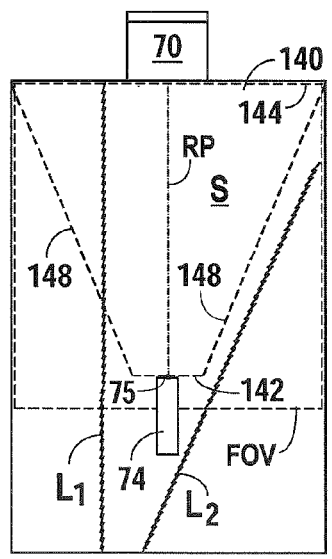
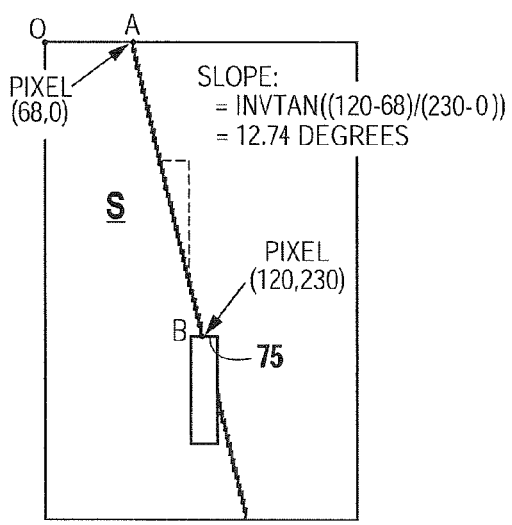
Fig. 9         Fig. 10

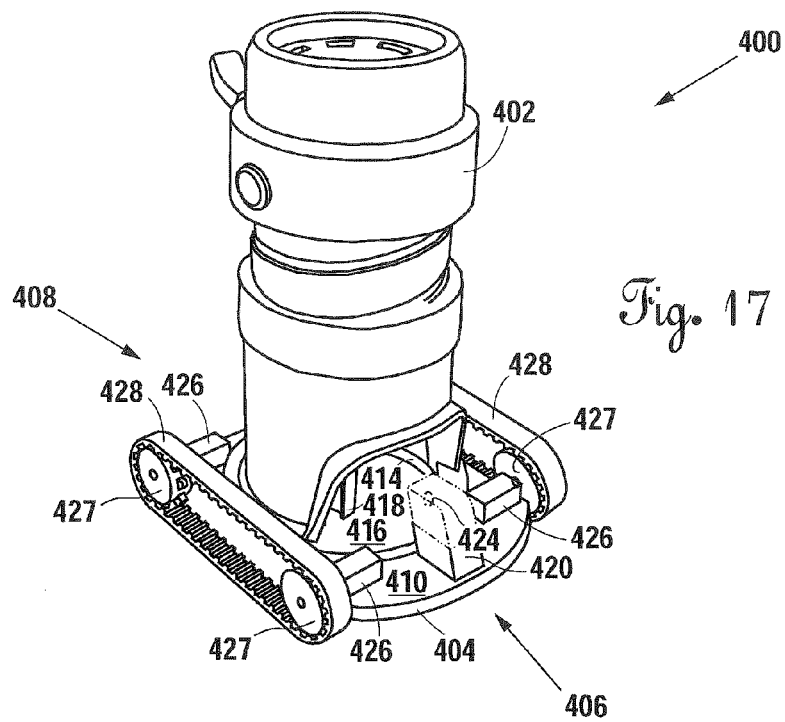
Fig. 17
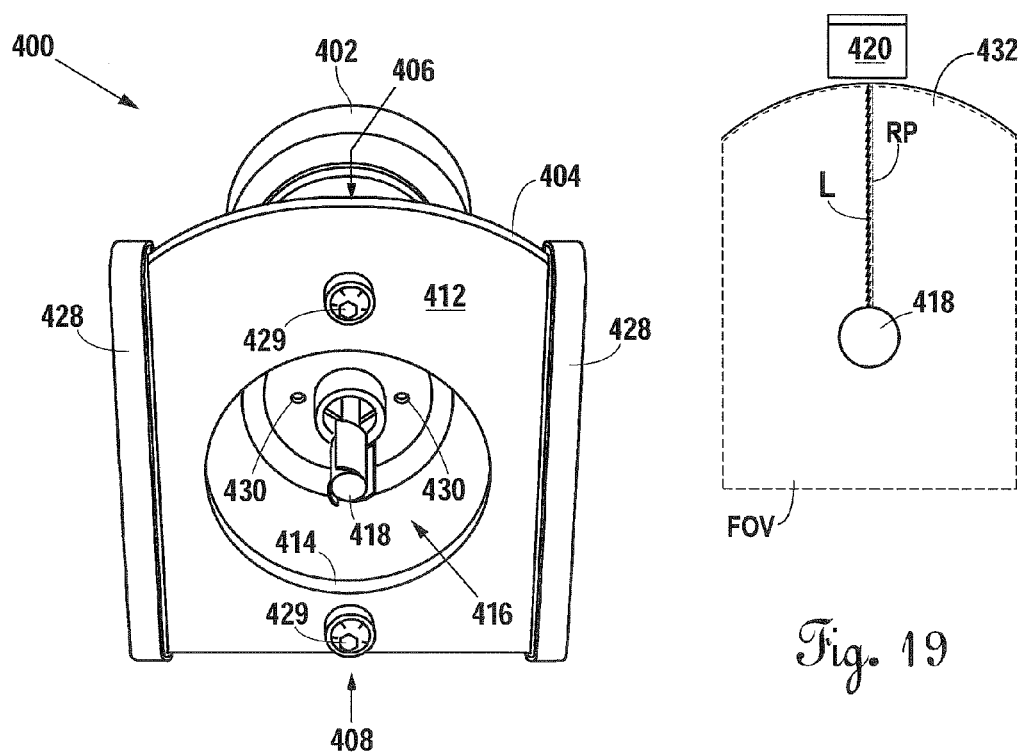
Fig. 18
Fig. 19

US 9,643,290 B1

LINE FOLLOWING POWER TOOL

CROSS REFERENCES TO RELATED APPLICATIONS

This original nonprovisional application claims the benefit of and priority to U.S. Provisional Application Ser. No. 62/016,925, filed Jun. 25, 2014, which is incorporated by reference herein.

FEDERALLY-SPONSORED RESEARCH

Not applicable.

BACKGROUND OF THE INVENTION

1. Field of the Invention

This invention relates to power tools. More specifically, this invention comprises a hand-held power tool that uses an optical sensor and microcontroller to detect a cut line, and then activates motors to steer the tool along the line.

2. Description of the Related Art

There are many types of power tools that use a number of mechanisms for providing the user with increased accuracy along a line. Current mechanisms rely on displaying the projected path of the tool and requiring the user to manually correct the tool's path.

BRIEF SUMMARY OF THE INVENTION

The present invention correct line deviations by a power tool more accurately than the user can manually. An apparatus for use with a machine tool that comprises a base plate with a cut hole; at least one drive motor attached to the base plate; at least one wheel mechanically attached to the at least one drive motor; a microprocessor electrically connected to the at least one drive motor, the microprocessor having a switch input and memory, the memory comprising parameters corresponding to the shape and position of a cut area and a cut point within the cut hole; a switch electrically connected to the switch input; and an optical sensor having an optical axis and a field of view, the optical sensor spaced a distance from the base plate between the first end and the cut hole and electrically connected to the microprocessor, the optical sensor oriented so that the cut hole is within the field of view.

BRIEF DESCRIPTION OF THE DRAWINGS

FIG. 5, which includes

FIGS. 6-9 show the cut area of the first embodiment in conjunction with various lines drawn on a surface to be cut.

FIG. 10 shows the calculation of the slope of a line relative to a cut point.

FIGS. 17-18 show a fourth embodiment of the invention.

FIG. 19 shows the cut area of the fourth embodiment in conjunction with a line drawn on a surface to be cut.

DETAILED DESCRIPTION OF CERTAIN EMBODIMENTS

As used herein, the point where a cutting implement (e.g., a jigsaw blade, a router bit, etc.) contacts the surface to be cut is the "cut point," and the area within which that a tool is physically capable of being maneuvered to cut relative to its current position without lifting the tool from the surface to be cut is the "cut area." An "optical axis" is an imaginary line that extending from the center point of, and normal to, a sensor or lens. "Microcontroller" includes, but is not limited to, microprocessors, ASICs, ASSPs, and FPGAs.

Figure 1:
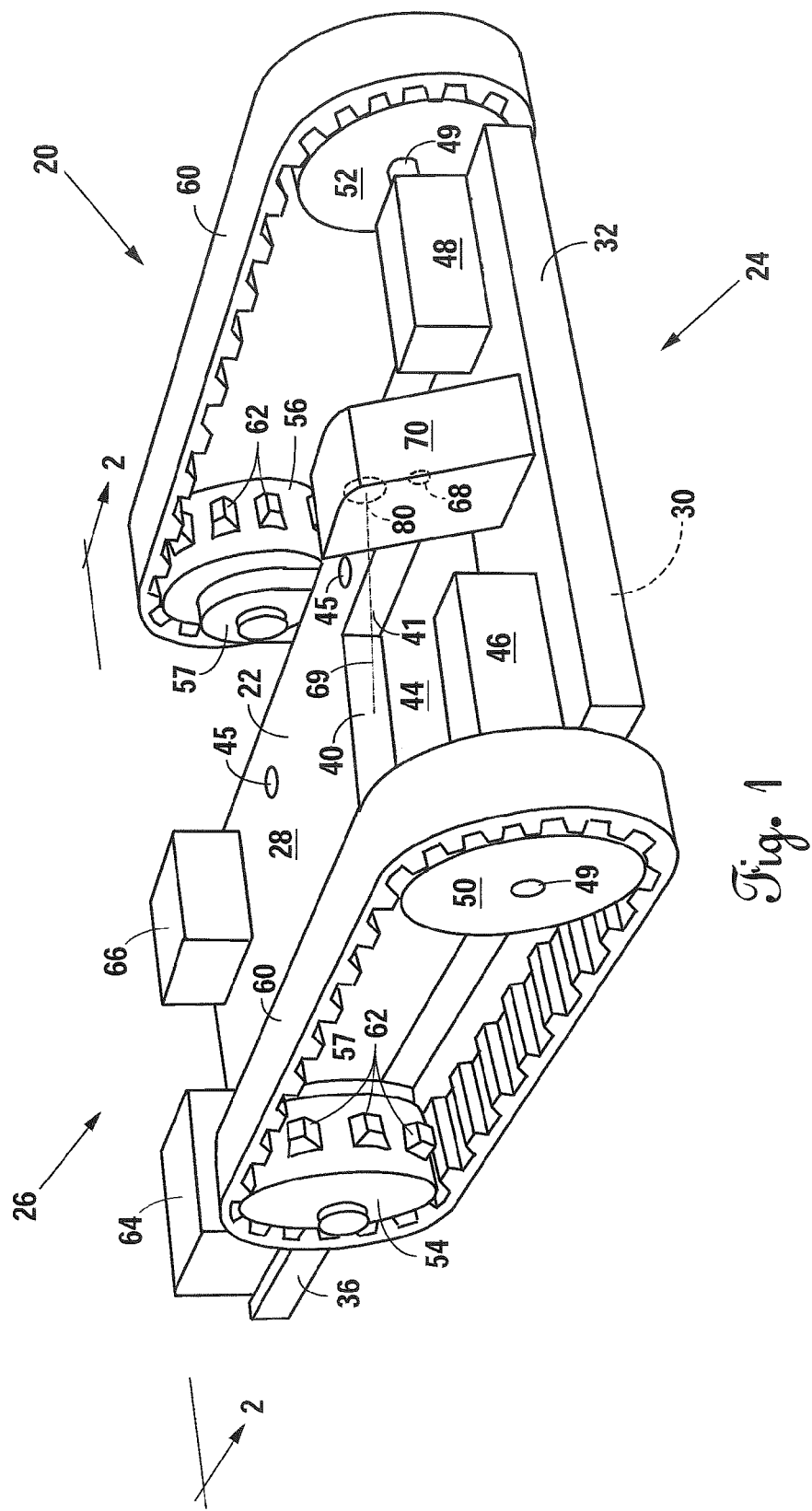
FIG. 1 is a front perspective view of a first embodiment of the invention.
Figure 2:
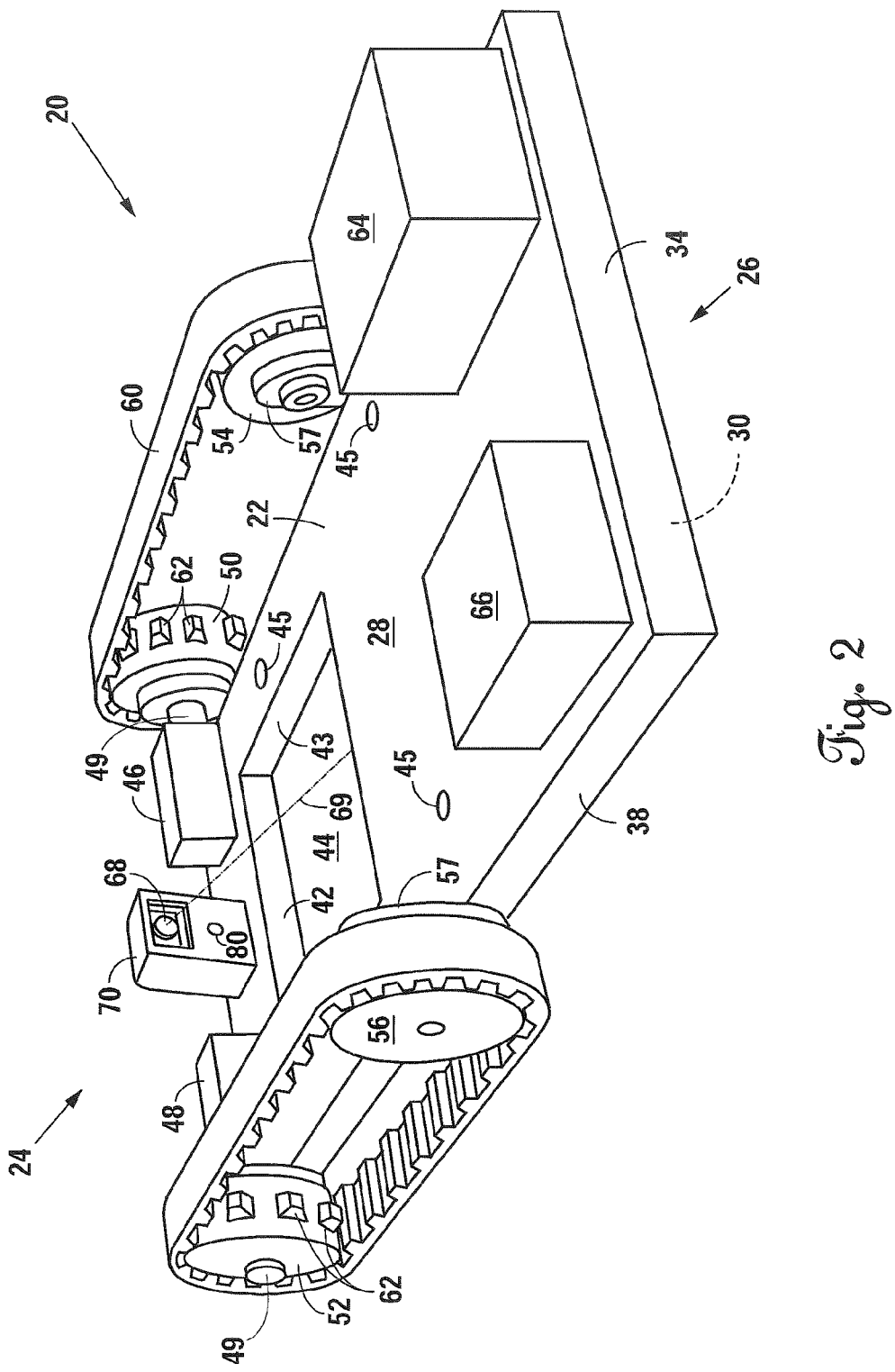
FIG. 2 is a rear perspective view of the first embodiment.

FIGS. 1-2 show a first embodiment 20 of the invention, which is an attachment for a power tool, such as a jigsaw, circular saw, router, or the like. The embodiment 20 includes a metal (e.g., aluminum) base plate 22 having a front end 24 and rear end 26. The base plate 22 has a planar top surface 28, a planar bottom surface 30 opposing the top surface 28, a front surface 32 (see FIG. 1), a rear surface 34 (see FIG. 2), and opposing side surfaces 36, 38. The base plate 22 has four planar inner side surfaces 40, 41, 42, 43 adjacent to and between the top and bottom surfaces 28, 30 that define a rectangular cut hole 44 extending between the top surface 28 and the bottom surface 30. Bolt holes 45 extend between the top surface 28 and bottom surface 30.

Two drive motors 46, 48 are mounted on the top surface 28 of the base plate 22 longitudinally between the cut hole 44 and the front surface 32. Two driven wheels 50, 52 are attached to the motors 46, 48 with axles 49. Two rear, non-driven wheels 54, 56 are attached to wheel mounts 57 mounted to the side surfaces 36, 38 longitudinally between the cut hole 44 and the rear surface 34. A track 60 is engaged with each pair of front and rear wheels. Each wheel 50, 52, 54, 56 has radial dogs 62 that engage with notches in the track 60. An exemplary drive motor is the 1000:1 Micro Metal Gearmotor HP available from Pololu Corporation, Las Vegas, Nev., which is a brushed DC motor. Other types of motors, such as stepper motors, may also be used.

Referring specifically to FIG. 2, the embodiment 20 further includes a battery pack 64, a microcontroller 66 having integrated memory, and an optical sensor 68 located within a sensor housing 70. The battery pack 64 is electrically connected to the microcontroller 66, the motors 46, 48, and the optical sensor 68. The microcontroller 66 is further electrically connected to the drive motors 46, 48 and sensor 68. The battery pack 64 and microcontroller 66 are mounted to the base plate 22 proximal to the junction between the top surface 28 and the rear surface 34. An exemplary optical sensor 68 is the Raspberry Pi camera module available from the Raspberry Pi Foundation, Caldecote, Cambridgeshire, United Kingdom.

The optical sensor 68 is positioned a distance above the base plate 22 and faces the direction of the cut hole 44 (i.e., the cut hole 44 is within the field of view of the sensor 68). The optical sensor 68 has an optical axis 69 that intersects the cut hole 44 and the base plate 22. A reference plane intersecting the optical axis and transverse to the wheel axes bisects the cut hole 44 and the base plate 22. An LED 80 is mounted to the housing 70 between the sensor 68 and the top surface 28 to provide light toward the cut hole 44.

Figure 3:
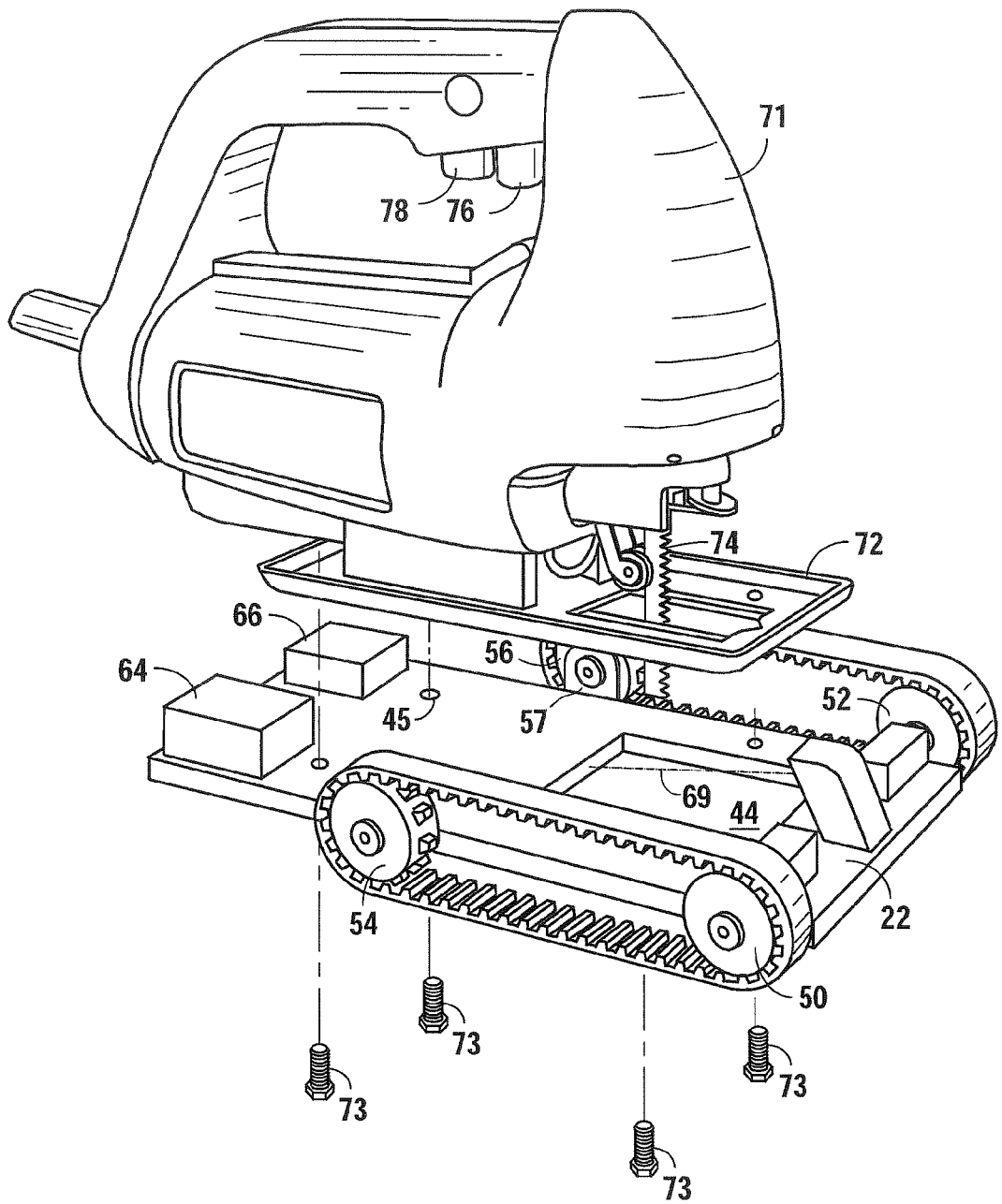
FIG. 3 is shows an assembly view of the first embodiment attached to a jigsaw.
Figure 4:
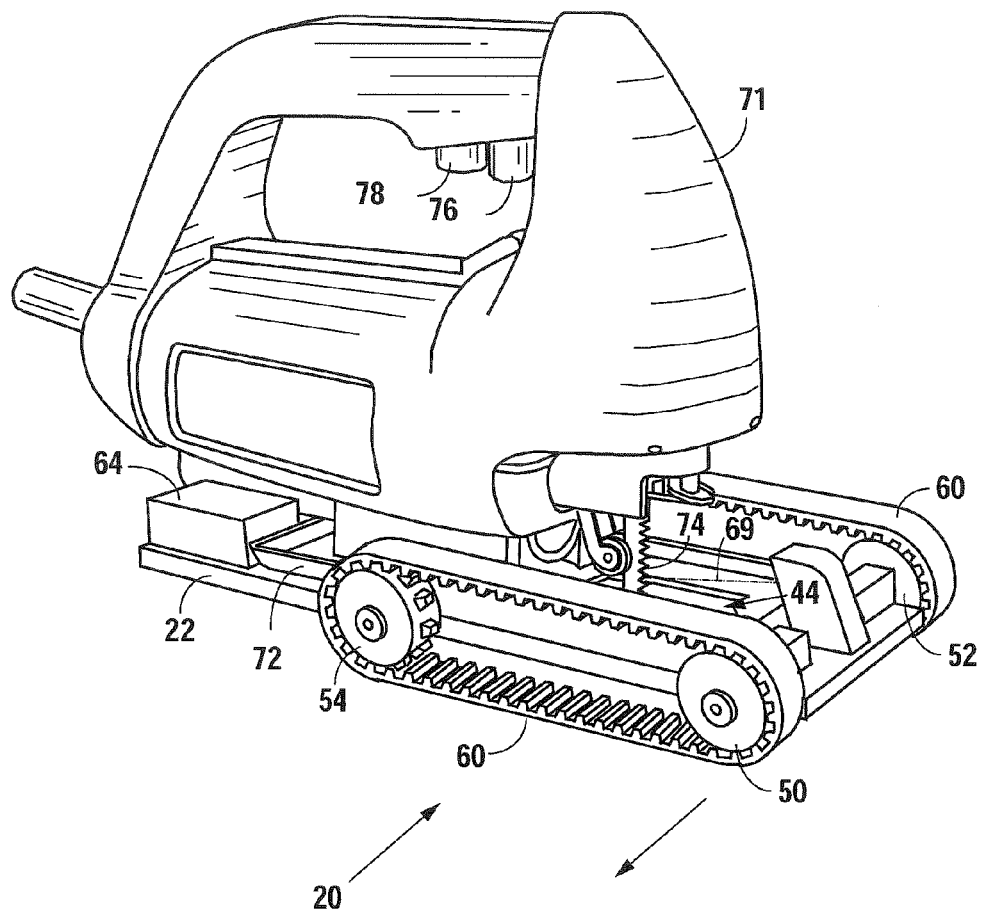
FIG. 4 shows an assembled view of the first embodiment attached to the jigsaw.

Referring to FIG. 3-4, the embodiment 20 may be attached to a jigsaw 71 having a skid plate 72 and a blade 74. The base plate 22 is bolted to the jigsaw's skid plate 72 with bolts 73. The blade 74 extends through the cut hole 44. Referring specifically to FIG. 4, the skid plate 72 contacts the base plate 22 longitudinally between the battery pack 64 and the optical sensor 68. The sensor 68 is oriented so its optical axis 69 intersects the blade 74 and a center plane extending the length of the embodiment 20. The blade 74 is longitudinally centered between the drive wheels 50, 52 and the non-driven wheels 54, 56. The combined center of mass of the embodiment 20 and the jigsaw is positioned longitudinally between driven wheels 50,52 and non-driven wheels 54, 56.

The jigsaw 71 includes a primary switch 76 for operating the tool motor and a second switch 78 proximal to the primary switch 76. The second switch 78 is electrically connected to the microcontroller 66.

Figure 5A:
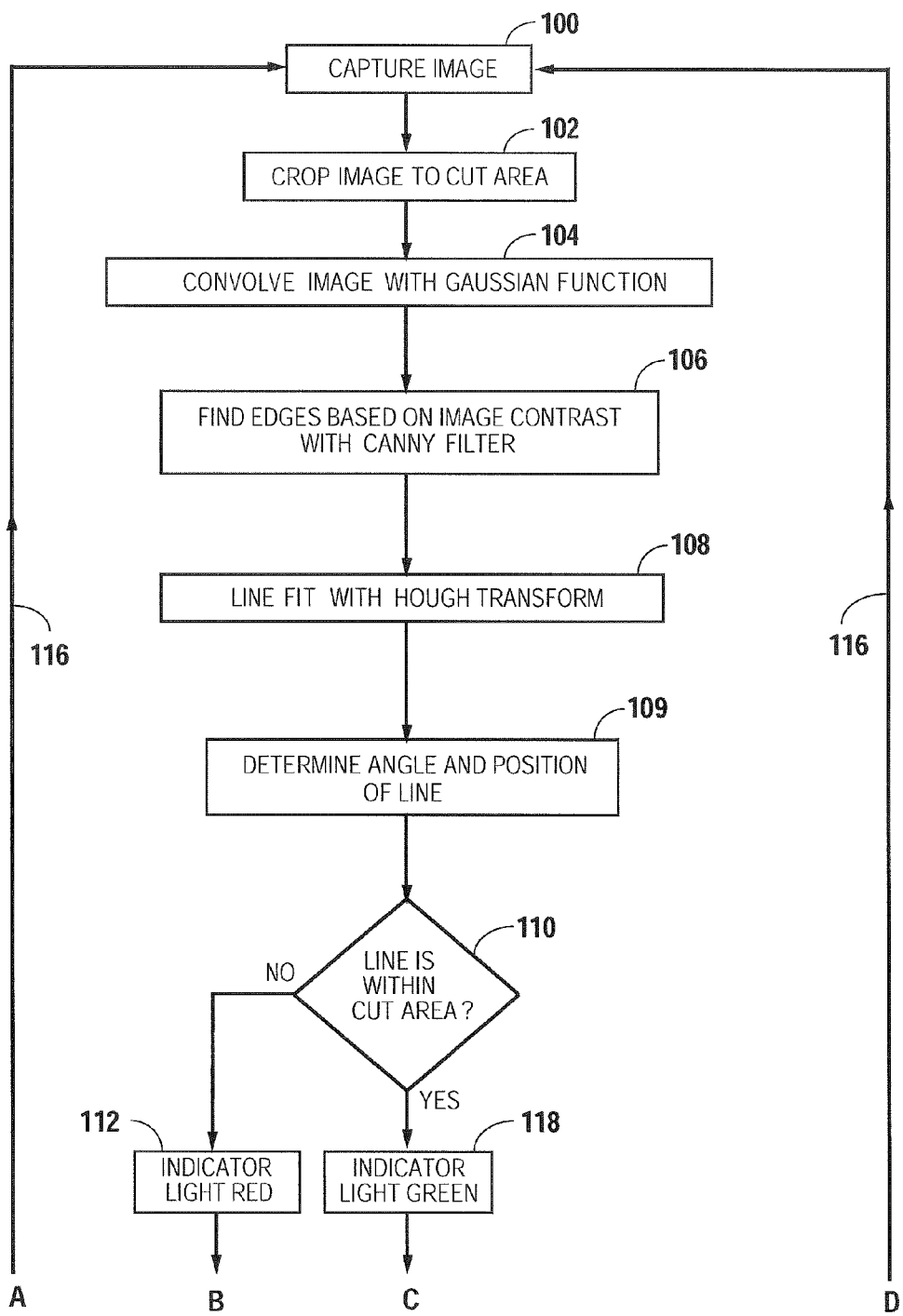
FIGS. 5A-5B, is a flowchart of the algorithm implemented by the microprocessor of the first embodiment.
Figure 5B:
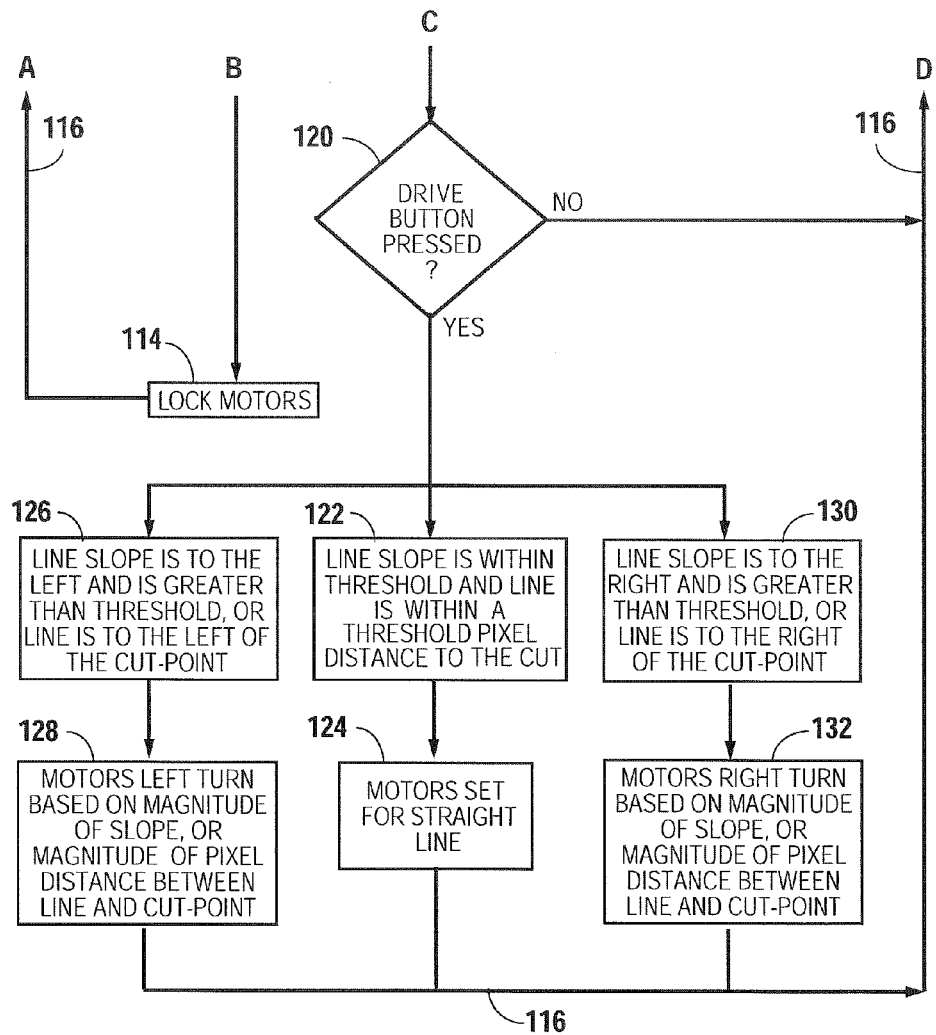

Referring to FIGS. 5A-5B, the microcontroller runs a set of instructions stored in the memory that causes none, one, or both of the driven wheels to be driven or locked. "Locking" a motor directs opposing high current on both motor and to drive it in two directions at once. In contrast, directing low current to a motors leads allows the motor to "coast" (i.e., turn freely).

First, the optical sensor captures 100 an image from a field of view that includes the cut hole. Second, the captured image is cropped 102 to the cut area of the tool.

Third, the portion of the image within the cut area is convolved 104 with a Gaussian function (i.e., applying a Gaussian blur). Applying a Gaussian blur reduces image noise and detail.

Fourth, the edges of the line are detected 106 using a Canny edge-detecting algorithm. See Canny, J., *A Computational Approach to Edge Detection*, IEEE Trans. Pattern Analysis and Machine Intelligence, 8(6):679-698, 1986, which is incorporated by reference.

Fifth, the position of the line is calculated 108 using a feature-extracting technique, such as a Hough transform. See U.S. Pat. No. 3,069,654 (issued Dec. 18, 1962), which is incorporated by reference.

Sixth, the angle and position of the line are determined 109 relative to a reference line normal to the cutting surface of the jigsaw blade (i.e., bisecting the cut area between the blade and the sensor).

Seventh, in step 110, the instructions determine whether the cut line is within the cut area. If the line is not within the cut area, a red LED is illuminated 112, the motors are locked 114, and the process ends 116 (i.e., loops back to the first step 100 of capturing a new image). If the line is within the cut area, a green LED is illuminated 118, and the second switch 78 (see FIGS. 3-4) is checked 120 for user input. If the second switch 78 is not pressed, the process ends 116.

If the second switch 78 is pressed, the process continues depending on the slope and position of the line. If the line slope is within the threshold for the cutting implement and the line is within a tool-specific threshold pixel distance to the cut point 122, the embodiment 20 is caused to move straight ahead by providing identical current to each drive motor 124. If the line slope is to the left (relative to an operator of the tool using the tool as intended) and is greater than the threshold or is to the left of the cut point 126, the embodiment is caused to move left 128 by an amount corresponding the slope magnitude or the maximum pixel distance between the line and cut point. If the line slope is to the right and is greater than the threshold or is to the right of the cut point 130, the embodiment is caused to move right by an amount corresponding the slope magnitude or the maximum pixel distance between the line and cut point 132.

FIGS. 6-9 show four instances of the algorithm being applied to a cut area 140 within the field of view FOV of the sensor 70 in relation to a jigsaw blade 74 that has a cutting surface 75 The cut area 140 is positioned over a surface S to be cut on which a reference line L has been drawn. Importantly, the cut area has a specific size and shape depending on the characteristics of the implement being used.

FIG. 6 shows a line L intersects with a reference plane RP that intersects the optical axis of the sensor 70. (For clarity, the reference plane RP is shown slight offset from the line L.) The cut area 140 is an isosceles trapezoid having a first base 142 that is parallel the cutting surface 75 of the blade 74, a second base 144, and legs 148. The portion of the line L within the area 140 intersects the cut point 150 and is straight. The. Thus, the algorithm causes the drive motors to drive the jigsaw straight.

In FIG. 7, the portion of the line L within the cut area 140 intersects the cut point and has an angle of 12.74 degrees to the left. Thus, the algorithm causes the drive motors to drive the jigsaw to the left.

Referring to FIG. 8, the portion of the line L within the image area does not intersect the cut point 150, but intersects the first base 142, which means the line L is within the threshold that will allow activation of the drive motors. The set of instructions described with reference to FIG. 5 would cause the tool to move left to try to realign itself. Importantly, the position of the cut point 150 relative to the line L shown in FIG. 8 is exaggerated because the algorithm would not cause the jigsaw to be in the position.

FIG. 9 shows two lines L1, L2 in which the algorithm would cause the drive motors to lock and would inhibit the tool from being driven. Neither line intersects the first base 142, meaning neither line is within the cut point threshold.

FIG. 10 shows the calculation of the slope of a line between Point A and Point B, which intersects the cut point. Point A is located at position (68, 0) relative to the Point O, the origin (0, 0). Point B is located at position (120, 230) relative to Point O. The slope of line relative to the optical axis is 12.74 degrees.

To use the embodiment 20, a user will draw a line with curves or angles that are achievable by the tool they are using. When the tool is placed over the start of the line, an indicator LED will indicate (with color) when the tool is in a proper position, and at a proper angle to make the cut based on the line drawn. The user will then engage the switch to power the tool's cutting motor, and then engage a secondary switch to enable the driving motors. The tool will continue to propel itself and cut along the line until either the line ends or the line varies at an angle or curve that is beyond the physical limitations of the tool being used. When the line ends, or if the line falls out of view, or in the case of a user error pushing the tool off of the line, the drive motors lock, resisting additional deviant motion.

Ideally, if the user was performing a cut that is too close to a cutting surface edge where the tracks used to propel the tool would no longer be on the cutting surface, the tracks could be removed or raised away from the cutting area to allow the tool to be operated independent from the ling tracking system.

Figure 11:
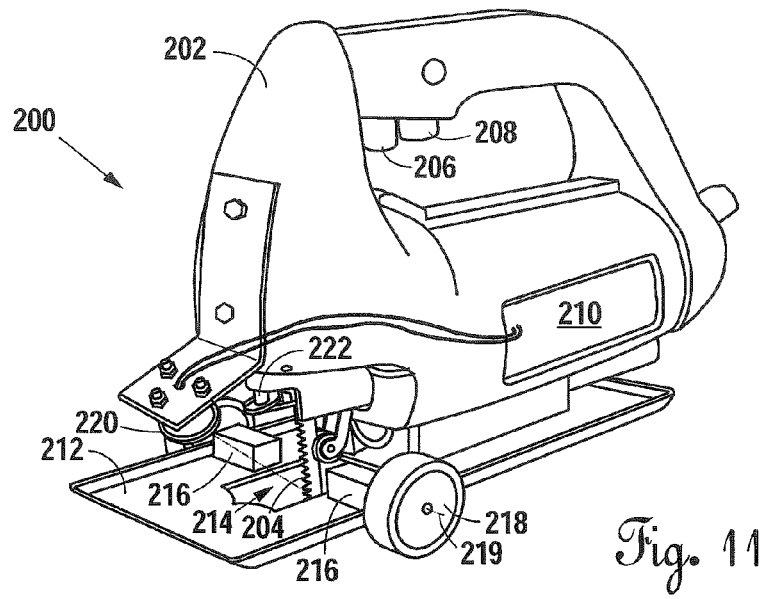
FIGS. 11-12 show a second embodiment of the invention.
Figure 12:
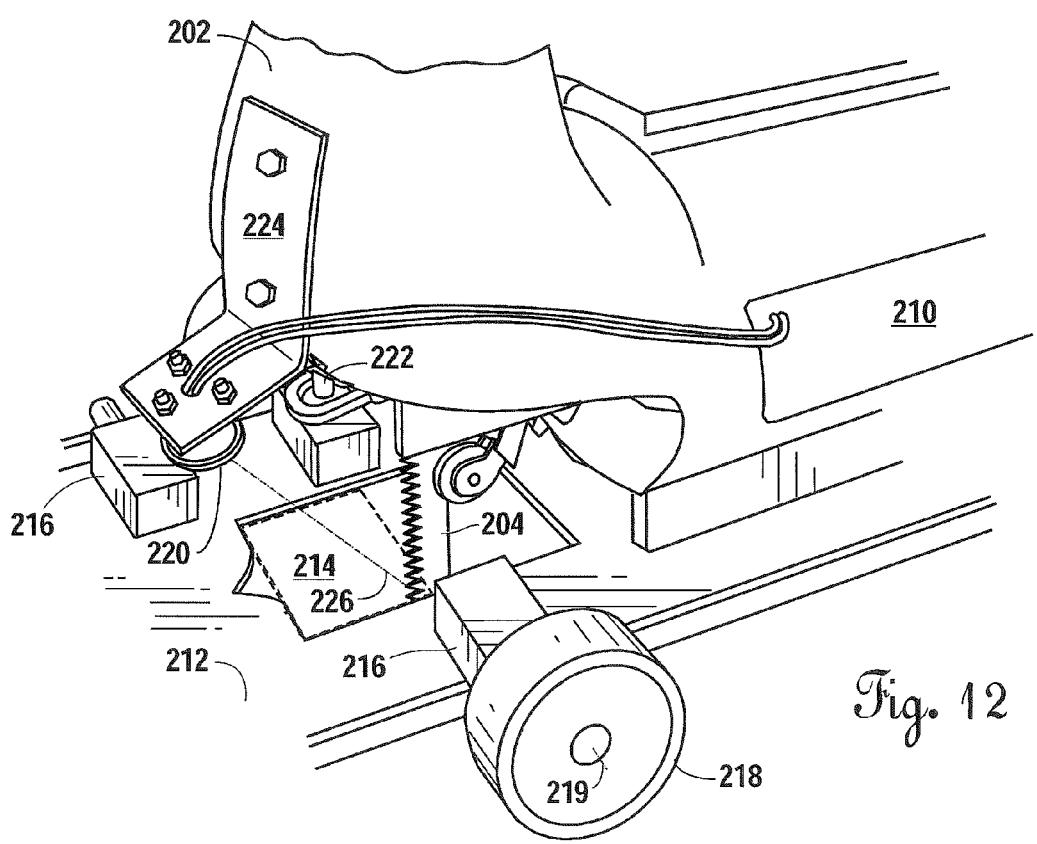

FIG. 11-12 show a second embodiment 200 of the invention in which elements of the attachment described with reference to FIGS. 1-2 are integrated with a jigsaw. The embodiment includes a housing 202 containing a tool motor (not shown), a reciprocating blade 204 connected to the tool motor, a primary switch 206 electrically connected to the tool motor, a secondary switch 208 electrically connected to a microprocessor 210, a skid plate 212 defining a cut hole 214, a pair of drive motors 216 positioned on either side of the cut hole 214, a pair of wheels 218 rotatable around wheel axes 219 and attached to the drive motors 216, an optical sensor 220 facing the cut hole 214, and a light source 222 positioned on the front end of the jigsaw housing 202. The blade 204 is centered between the wheels 218 and a plane intersecting the wheel axes 219 intersect the cut point.

While the embodiment 200 comprises a primary and a secondary switch, alternative embodiments contemplate a single switch to simultaneously actuate both the tool motor and the drive motors.

The sensor 220 and light source 222 are attached to the housing 202 above the skid plate 212 using a bracket 224. The sensor 220 has an optical axis 226 that intersects the cut hole 214 and blade 204. A plane intersecting the optical axis 226 and transverse the wheel axes. bisects the cut hole 214 and the base 212.

Figure 13:
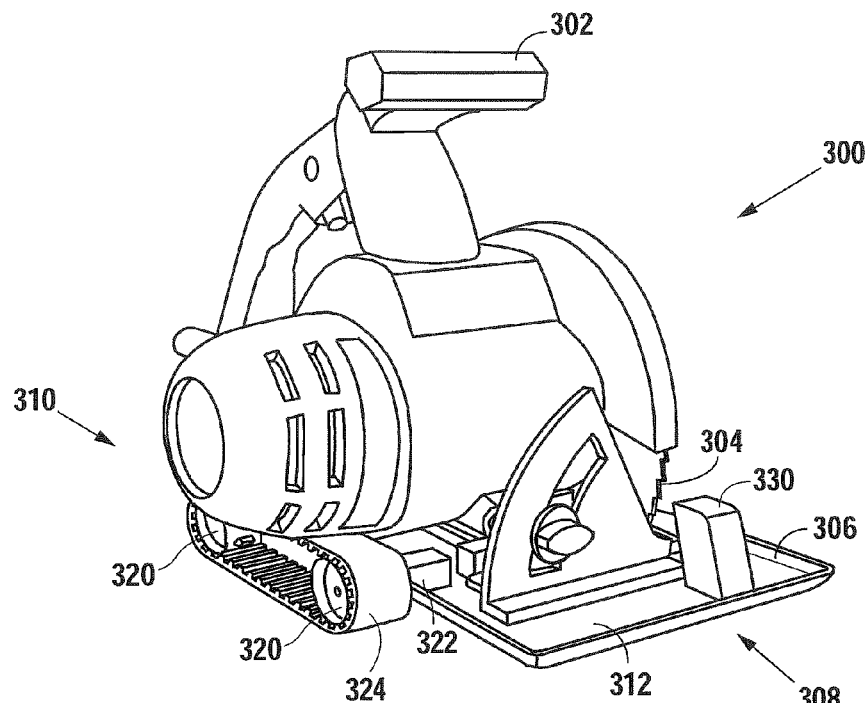
FIGS. 13-15 show a third embodiment of the invention.
Figure 14:
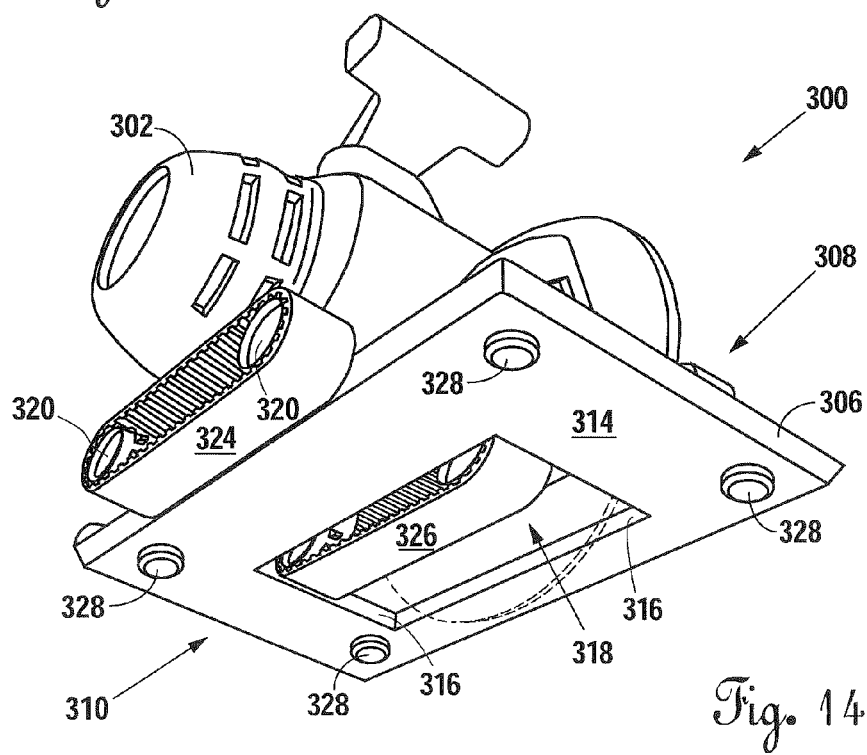
Figure 15:
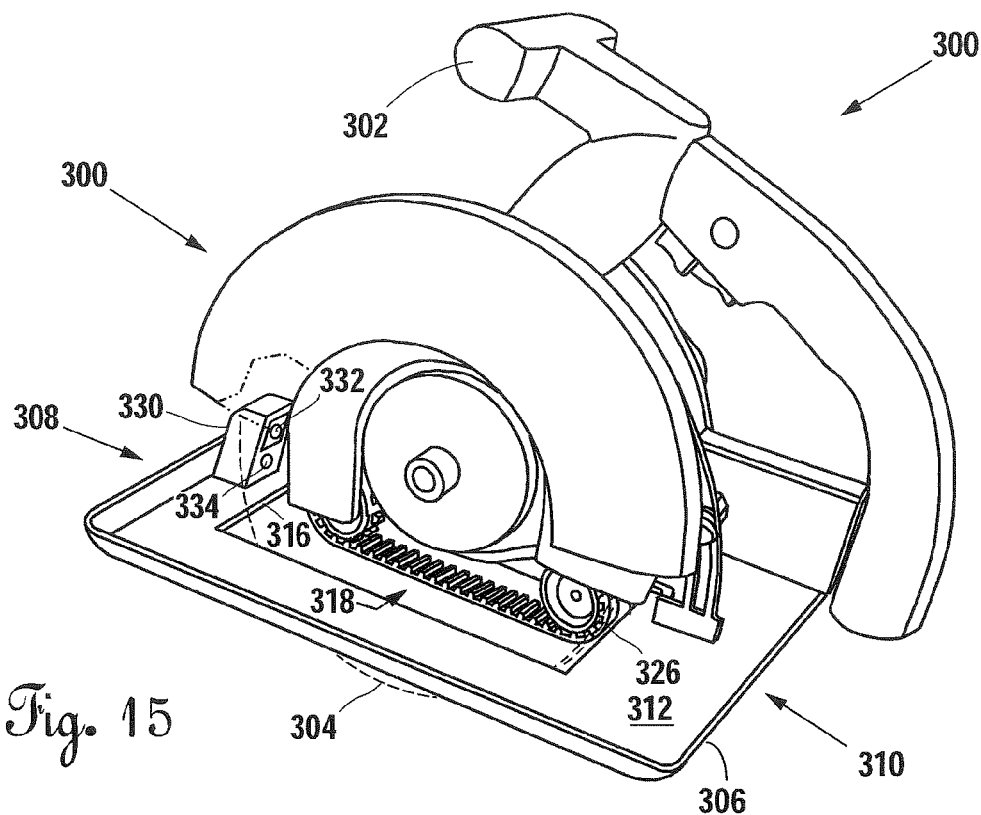

FIG. 13-15 show a third embodiment 300 of the invention that comprises a circular saw 302 having a blade 304. The embodiment 300 includes a skid plate 306 having a front end 308 and rear end 310. The skid plate 306 also has a top surface 312, a planar bottom surface 314 opposing the top surface 312, and inner side surfaces 316 adjacent to and between the top and bottom surfaces 312, 314 and defining a rectangular cut hole 318 between the top surface 312 and the bottom surface 314. The blade 304 extends through the cut hole 318.

Wheels 320 are connected to drive motors 322 mounted to the skid plate 306. Continuous tracks 324, 326 are connected between each pair of wheels 320, with one track 326 extending through the cut hole 318.

Referring to FIG. 14, guides 328 are mounted to the bottom surface 314 of the skid plate 306. Each guide 328 has a height equal to the distance of the gap between the bottom of the tracks 324, 226 and the bottom surface 314 of the skid plate 306.

Referring to FIG. 15, a housing 330 containing an optical sensor 332 is mounted to the skid plate 306 such that the sensor 332 is facing the cut hole 318 so that its optical axis intersects the blade 304. An LED 334 is mounted to the housing 330 to direct light toward the cut hole 318.

Figure 16:
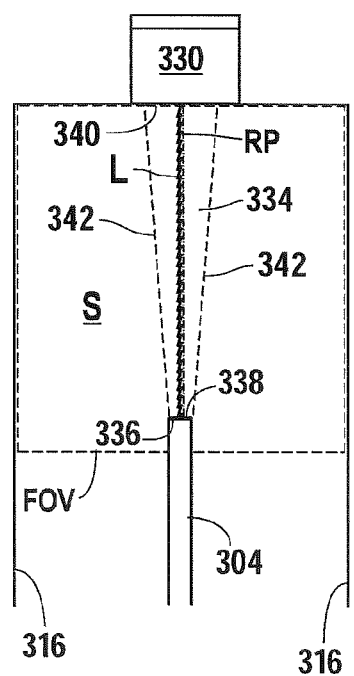
FIG. 16 shows the cut area of the third embodiment in conjunction with a line drawn on a surface to be cut.

FIG. 16 shows the cut area 334 for the third embodiment in relationship to the blade 304, which has a cutting surface 336. The cut area 334 is an isosceles trapezoid having a first base 338, a second base 340, and legs 342. The width of the first base 338 is equal to the width of the cutting surface 336. The cut area 334 is positioned over a surface S to be cut on which a line L has been drawn. Because of the length of the blade 304 relative to the jigsaw blade previously described, turning the blade during use is more difficult and the cut area 334 is smaller than the cut area shown in FIGS. 6-9.

FIGS. 17-18 show a fourth embodiment 400 of the invention that comprises a router housing 402 containing a tool motor (not shown). The embodiment 400 includes a skid plate 404 having a front end 406 and rear end 408. The skid plate 404 also has a first planar surface 410, a second planar surface 412 opposing the first planar surface 410, and a cylindrical surface 414 adjacent to and between the first and second planar surfaces 410, 412 and defining a cylindrical cut hole 416 between the first planar surface 410 and the second planar surface 412. A router bit 418 is attached to the tool motor and extends through the cut hole 416. A sensor housing 420 contains an optical sensor 424 that faces the cut hole 416. Four drive motors 426 are mounted to the skid plate 404. A wheel 427 is attached to each drive motor 426. A continuous track 428 is connected around opposing pairs of wheels 427.

Referring specifically to FIG. 18, guides 429 are mounted to the second surface 412 of the skid plate 404. Each guide 429 has a height equal to the distance of the gap between the bottom of the track 428 and the second surface 412 of the skid plate 404. LEDs 430 are mounted to the router housing 402 and oriented to direct light toward the bit 418.

FIG. 19 shows the cut area 432 of the embodiment relative to the router bit 418. Because the fourth embodiment can cut in any direction, the only limitation to the cut area 432 is the sensor's 424 field of view. Because of the embodiment's symmetry around the bit 418, if a line slope exceeds the sensor's field of view, it can easily be searched for and relocated by rotating the router housing 402 around the cutting bit 418.

The present invention is described in terms of specifically-described embodiments. Those skilled in the art will recognize that other embodiments of such device can be used in carrying out the present invention. Other aspects and advantages of the present invention may be obtained from a study of this disclosure and the drawings, along with the appended claims.

I claim:

1. An apparatus for use with a machine tool having a cutting implement, the apparatus comprising:
    a base plate having a first end and an opposing second end, a first surface and an opposing second surface, at least one inner side surface defining a cut hole between the first surface and the second surface;
    at least one drive motor attached to the first surface of the base plate;
    at least one wheel mechanically attached to the at least one drive motor;
    a microprocessor electrically connected to the at least one drive motor, the microprocessor having a switch input and memory, the memory comprising parameters corresponding to the shape and position of a cut area and a cut point within the cut hole;
    a switch electrically connected to the switch input; and
    an optical sensor having an optical axis and a field of view, the optical sensor spaced a distance from the base plate between the first end and the cut hole and electrically connected to the microprocessor, the optical sensor oriented so that the cut hole is at least partially within the field of view.

2. The apparatus of claim 1 wherein and the optical axis is angled relative to the first surface.

3. The apparatus of claim 2 wherein the optical axis intersects the cut hole.

4. The apparatus of claim 1 further comprises a set of instructions contained within the memory, the set of instructions operable to:
    capture an image with the optical sensor;
    detect the edges of a line drawn on a surface to be cut;
    calculate the position of the line within the cut area;
    determine the angle and position of the line relative to the cut point; and
    if the line is within the cut area and the switch is actuated, actuating the at least one drive motor.

5. The apparatus of claim 4 wherein said set of instructions is further operable to lock the at least one drive motor if the line is not within the cut area.

6. The apparatus of claim 4 wherein said set of instructions is further operable to convolve the image with a Gaussian function.

7. A power tool comprising:
    a tool housing containing a tool motor;
    a cutting implement connected to the tool motor;

a first switch electrically connected to the tool motor;

a skid plate having a first end and an opposing second end, a first surface and an opposing second surface, at least one inner side surface defining a cut hole between the first surface and the second surface, the cutting implement extending through the cut hole;

at least one drive motor attached to the first surface of the skid plate;

at least one wheel mechanically attached to the at least one drive motor;

a microprocessor electrically connected to the at least one drive motor, the microprocessor having a switch input and memory, the memory comprising parameters corresponding to the shape and position of a cut area and a cut point within the cut hole;

a switch electrically connected to the switch input; and an optical sensor having an optical axis and a field of view, the optical sensor spaced a distance from the base plate between the first end and the cut hole and electrically connected to the microprocessor, the optical sensor oriented so that the field of view is centered on the cutting implement.

8. The power tool of claim 7 wherein and the optical axis is angled relative to the first surface.

9. The power tool of claim 8 wherein the optical axis intersects the cut hole.

10. The power tool of claim 7 further comprises a set of instruction contained within the memory, the set of instructions operable to:

capture an image with the optical sensor;

detect the edges of a line drawn on a surface to be cut;

calculate the position of the line within the cut area;

determine the angle and position of the line relative to the cut point; and if the line is within the cut area and the switch is actuated, actuating the at least one drive motor.

11. The power tool of claim 10 wherein said set of instructions is further operable to lock the at least one drive motor if the line is not within the cut area.

12. The power tool of claim 10 wherein said set of instructions is further operable to convolve the image with a Gaussian function.

* * * * *